Figure 1:
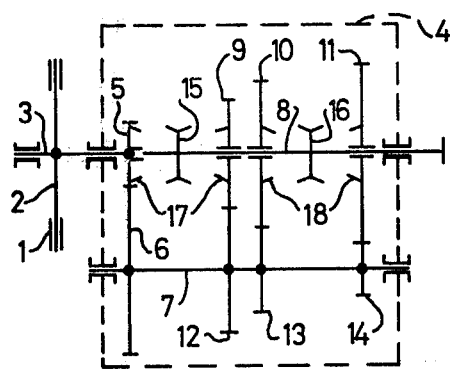

United States Patent [19]

Müller

[11] 4,189,041
[45] Feb. 19, 1980

[54] SYNCHRONIZED CHANGE-SPEED GEAR UNIT

[75] Inventor: Erich Müller, Kornwestheim, Fed. Rep. of Germany

[73] Assignee: Getrag Getriebe- und Zanhradfabrik GmbH, Ludwigsburg, Fed. Rep. of Germany

[21] Appl. No.: 855,136

[22] Filed: Nov. 28, 1977

[30] Foreign Application Priority Data

Dec. 30, 1976 [DE] Fed. Rep. of Germany ....... 2659448

[51] Int. Cl.$^2$ ............................................. F16D 23/06
[52] U.S. Cl. ............................... 192/53 F; 192/114 T
[58] Field of Search ........................... 192/53 F, 114 T

[56] References Cited

U.S. PATENT DOCUMENTS

| | | | |
|---|---|---|---|
| 2,201,169 | 5/1940 | Griswold | 192/53 F |
| 2,397,943 | 4/1946 | Bull | 192/53 F |
| 3,110,191 | 11/1963 | Schulze | 192/53 F X |

FOREIGN PATENT DOCUMENTS

| | | | |
|---|---|---|---|
| 1941968 | 7/1966 | Fed. Rep. of Germany . | |
| 487235 | 11/1951 | France | 192/114 T |
| 1036472 | 4/1953 | France | 192/53 F |
| 513974 | 7/1938 | United Kingdom . | |

*Primary Examiner*—Allan D. Herrmann
*Attorney, Agent, or Firm*—William D. Hall

[57] ABSTRACT

The present invention relates to a synchronized change-speed gear unit for automobiles, having a pair of gear wheels which can be engaged into or disengaged from the power train by axially shifting an internally toothed gear-shift sleeve which is connected with a shaft via a guide sleeve so as to be torsionally rigid, an externally toothed clutch body being rigidly secured to the one gear wheel which is coaxial with the gear-shift sleeve; each clutch body is associated with a synchronizing ring which, in the circumferential direction, is in positive connection with the gear-shift sleeve and in frictional contact with the clutch body and which has a lock toothing permitting meshing of the internal toothing of the gear-shift sleeve with the external toothing of the clutch body at synchronous speed only. To reduce the gear-shift travel, the teeth of the gear-shift sleeve are axially extended towards the clutch body in at least two, preferably three places of the circumference and the synchronizing ring has lock teeth in the zones of the unextended teeth of the gear-shift sleeve only. The gear-shift travel reduction thus achieved is possible without increased power demand.

11 Claims, 6 Drawing Figures

SYNCHRONIZED CHANGE-SPEED GEAR UNIT

The present invention relates to a synchronized change-speed gear unit for automobiles, having at least one pair of gear wheels which can be engaged into or disengaged from the power train by axially shifting an internally toothed gear-shift sleeve which is connected with a shaft via a guide sleeve so as to be torsionally rigid, an externally toothed clutch body being rigidly secured to the one gear wheel which is coaxial with the gear-shift sleeve as well as having a synchronizing ring which, in the circumferential direction, is in positive connection with the gear-shift sleeve and in frictional contact with the clutch body and which has a lock toothing permitting meshing of the internal toothing of the gear-shift sleeve with the external toothing of the clutch body at synchronous speed only.

A great number of such change-speed gear units is known and described in the literature (cf. Bussien, Automobiltechnisches Handbuch, volume 2, pages 243 through 247). When engaging another gear, the gear-shift sleeve, starting from the neutral position, is axially shifted via a selector fork engaging in an external circumferential groove and at the same time said gear-shift sleeve pressing the synchronizing ring which is provided with an internal cone against the counter cone of the clutch body. Due to the frictional contact between the synchronizing ring and the clutch body a speed matching between the shaft, gear-shift sleeve and synchronizing ring, on the one hand, and the clutch body and the one gear wheel of the pair of gear wheels pivoted on the shaft, on the other hand, is effected. As long as the synchronous speed has not been attained, the synchronizing ring is slightly turned in the circumferential direction relative to the gear-shift sleeve, whereby the lock toothing of the synchronizing ring having at least approximately the same pitch circle blocks further axial shifting of the gear-shift sleeve towards the clutch body. However, once the synchronous speed has been attained, the shift-gear sleeve, the internal toothing of which is provided with tilts or taper faces at the front end, is able to swing the synchronizing ring into the congruence position of the two toothings by cooperating with corresponding opposite tilts or taper faces of the lock toothing. Then, the gear-shift sleeve can be axially shifted beyond the synchronizing ring until it engages the teeth of the clutch body.

On the side facing away from the gear wheel, the clutch body teeth are also provided with tilts or taper faces to facilitate the introduction of the internal toothing of the gear-shift sleeve.

The required gear-shift travel is practically defined by the spacing between a front end plane ring face of the gear-shift sleeve and the opposite front end of the coaxial gear wheel. This spacing is a little larger than the sum of the axial extension of the clutch body teeth and the lock teeth of the synchronizing ring plus a small safety distance between the gear-shift sleeve and the lock teeth of the synchronizing ring, on the one hand, and the lock teeth of the synchronizing ring and the clutch body toothing, on the other hand. This clear distance cannot be kept indefinitely small because the synchronizing ring has not an exactly defined axial position relative to the clutch body, since the synchronizing ring, for manufacturing reasons and because of the inevitable wear, is not in an exactly definable and constant distance from the toothing of the clutch body, owing to the frictional coupling via the cone. With a given transmission ratio, the gear-shift travel at the control button of the gear-shift lever is therefore directly proportional to said clear distance between the gear-shift sleeve and the gear wheel which is coaxial with the gear-shift sleeve. To reduce the gear-shift travel at the control button of the gear-shift lever, which in many cases is required for operating and space reasons, the only possibility has hitherto been to vary the transmission ratio between the gear-shift lever end on the operating side and the gear-shift sleeve. However, by varying this transmission ratio, the operating force is simultaneously varied to the same degree. If, for example, the gear-shift travel at the control knob of the gear-shift lever is reduced by two thirds, the operating force increases by fifty percent. However, this is generally unacceptable and a reduction of the gear-shift travel at the control knob of the gear-shift lever has therefore not been possible.

It is the object of the present invention to achieve a reduction of the gear-shift travel at the control end of the gear-shift lever without appreciably increasing the necessary shift force or alternatively, without varying the travel of the gear-shift lever, to increase the gear-shift lever transmission ratio and consequently, with the force at the gear-shift lever remaining constant, to have a correspondingly higher force available at the gear-shift sleeve for the synchronization or rather, with the force at the gear-shift sleeve remaining the same, to have to exert a smaller force at the gear-shift lever.

Starting from a change-speed gear unit of the type mentioned at the beginning, this object is achieved according to the invention by axially extending the teeth of the gear-shift sleeve towards the clutch body in at least two, preferably three places on the circumference and by providing the synchronizing ring with lock teeth in the zones of the unextended teeth of the gear-shift sleeve only.

An advantage of the embodiment of a change-speed gear unit according to the invention consists in that the gear-shift travel is reduced by the amount of the extension of the teeth of the gear-shift sleeve without the slightest increase of the shift force being involved. In a conventional gear unit in which the gear-shift travel of the gear-shift sleeve was 11 mm, it is, for example, possible to reduce this gear-shift travel to 7 mm, i.e. less than two thirds. In this case it is particularly advantageous that the number of the dimensional tolerances which influence the clear distance between the extended teeth of the gear-shift sleeve and the teeth of the clutch body is reduced and that in particular the tolerance resulting from the displacement of the synchronizing ring at the cone of the clutch body is not included in these tolerances. For example, the clear distance between the front side of the internal toothing of the longer teeth of the gear-shift sleeve and the opposite front side of the external toothing of the clutch body may be dimensioned with approximately 2 mm. With a conventional axial length of the clutch body toothing of 5 mm the resulting gear-shift travel is then 7 mm. Admittedly, in the change-speed gear unit according to the invention the number of the teeth involved in the power transmission is reduced, but this does not result in a stress increase beyond a degree affecting the teeth life so that this stress increase remains without effect. The production is relatively simple and cheap. It merely consists in first machining all teeth to the same longer length and in subsequently milling off the longer teeth or, in the case of non-cutting shaping (e.g. sintering, forging, casting), indirectly manufacturing the axial stage. The desired gear-shift travel reduction to approximately two thirds of the original value is achieved without reducing the axial length of the clutch body teeth or the working depth of the gear-shift sleeve and clutch body toothings.

The gear-shift sleeve teeth of various lengths may be arranged on different diameters. However, in preferred embodiments of the invention, the axially extended as well as the axially unextended teeth of the gear-shift sleeve are arranged on the same pitch circle. This, first of all, offers production advantages because all teeth can be manufactured by means of the same broaching tool having a circle circumference as outer contour. Following the production of the sectional form of the teeth the length of a part of the teeth is reduced according to the invention. However, gear-shift sleeves with very high teeth can also be used which are skewed in two different radial planes, the outer plane being axially extended.

The axial front ends of the teeth are provided with tilts or taper faces in order to facilitate engagement during the axial movement in all cases in which tooth happens to be to tooth. For this purpose, both the teeth of the gear-shift sleeve and the lock teeth of the synchronizing ring as weel as the teeth of the clutch body are provided with such tilts or taper faces. In the known gear-shift sleeves the vertical angles of the taper faces or tilts are equal for all teeth. However, in preferred embodiments of the invention, the tilts of the extended teeth which are provided at the axial front ends of the gear-shift sleeve teeth include another vertical angle than the unextended teeth cooperating with the lock toothing of the synchronizing ring. In this case, the vertical angle of the extended teeth of the gear-shift sleeve is preferably smaller than the vertical angle of the unextended teeth.

Due to the separation of the functions of the various teeth portions of the gear-shift sleeve, an optimal matching of the vertical angle of the tilts or taper faces at the axial front ends of the teeth to the respective function is also possible. This allows to influence or improve the shift performance of the synchronizing mechanism in the desired manner. The vertical angle of the extended teeth is approximately 80° to 100° and preferably 90°, whereas the vertical angle of the unextended teeth is between approximately 100° and 120°, preferably 110°.

The extension of a portion of the teeth of the gearshift sleeve or rather the length difference between the longer and the shorter teeth of the gear-shift sleeve may be such that, with a gear being engaged, all teeth of the gear-shift sleeve are in mesh with the teeth of the clutch body, only the axial working depth being different. However, in preferred embodiments of the invention the extension of a portion of the teeth of the gear-shift sleeve is such that, with a gear being engaged, the unextended teeth are relieved from torque transmission. Consequently, in this embodiment of the invention, with a gear being engaged, the unextended teeth do not mesh with tooth flank portions adjoining the tilts or taper faces. In this case, in conventional automobile gear units, the number of the meshing teeth which are consequently participating in the torque transmission is still sufficient to preclude overloading of the teeth which would impair the life of the synchronization mechanism. This portion of the axial length of the teeth according to the invention offers the possibility of simplifying the production of the gear-shift sleeve. To avoid the jumping out of the gear under load, the gear-shift sleeve and clutch body teeth which mesh with one another and transmit the torque are "backed". In the case of this backing the tooth flanks are not inclined parallel to the axis but slightly thereto. The tooth flanks of the gear-shift sleeve and clutch body teeth bearing against one another are skewed so that a force is produced which, during the transmission of a torque, presses the gear-shift sleeve towards the gear wheel and thus maintains the engagement of the teeth. The backing, i.e. the skewing of the tooth flanks relative to the wheel axis is admittedly very simple in the case of the external toothing of the clutch body but it is difficult in the case of the production of the internal toothing of the gear-shift sleeve because the gear-shift sleeve is always arranged symmetrically to a center plane, since the same gear-shift sleeve is used for shifting two gears. However, the backing must also be symmetrical, which means that the teeth are tapering towards the center plane of the gear-shift sleeve. However, if not all teeth of the gear-shift sleeve are in mesh with the clutch body, backing of all teeth of the gear-shift sleeve is not necessary either. In a preferred embodiment of the invention in which the teeth of the clutch body are axially tapering towards the gear wheel, the extended teeth of the gear-shift sleeve transmitting the torque are backed and the unextended teeth of the gear-shift sleeve have flanks which are parallel to the axis. This simplifies the production because the extended and hence axially projecting teeth are better suited for the tooling of the backing. Nevertheless, as desired, the gear is guaranteed to remain engaged.

It is necessary to limit the gear-shift travel so that it can be clearly felt by the user. Mechanical stops in the vicinity of the control linkage or of the gear-shift transmission members would be an additional complication. It is therefore intended to provide the gear-shift motion limit in the vicinity of the gear-shift sleeve. For this purpose, in a preferred embodiment of the invention, the tooth thickness of the unextended teeth of the gear-shift sleeve is larger than the corresponding width of the tooth space of the clutch body. This prevents an engagement even if the extended teeth are not yet contacting the gear wheel which adjoins the clutch body (in case said gear wheel has a sufficient diameter). Instead of an increase of the tooth thickness it is also possible to increase the tooth height so that the tooth tip of the gear-shift sleeve bears with its front end against the front end of the tooth root of the clutch body to limit the gear-shift motion. For this purpose, it is basically sufficient if the contour of the unextended teeth overlaps the contour of the corresponding tooth spaces of the clutch body at least in one place.

Figure 3:
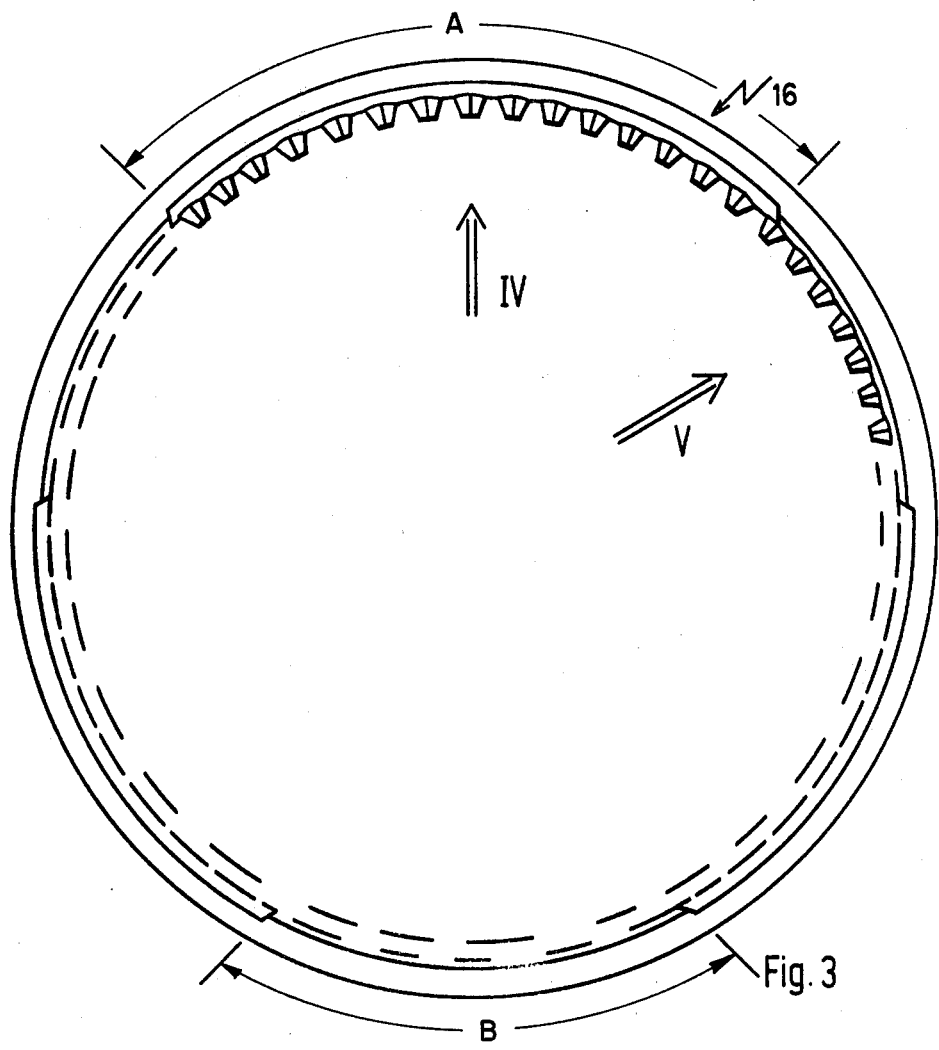
Figure 2:
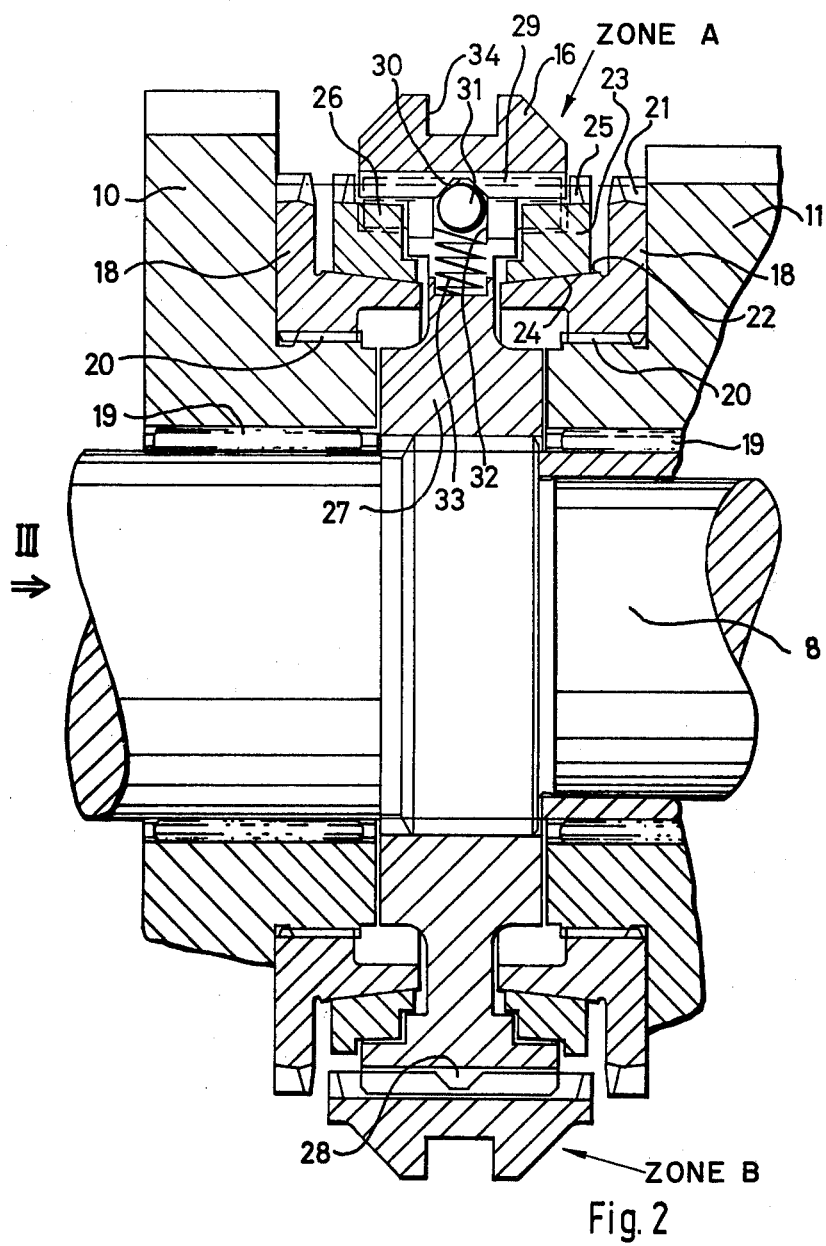
Figure 4:
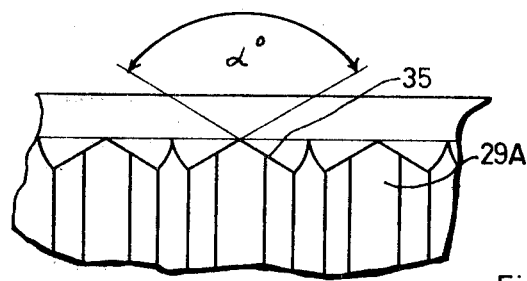
Figure 5:
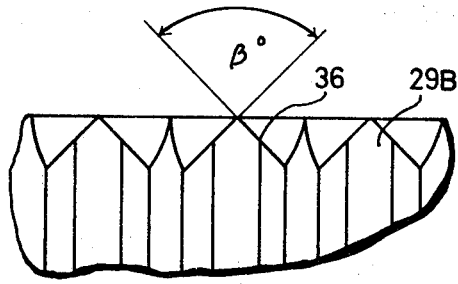
Figure 6:
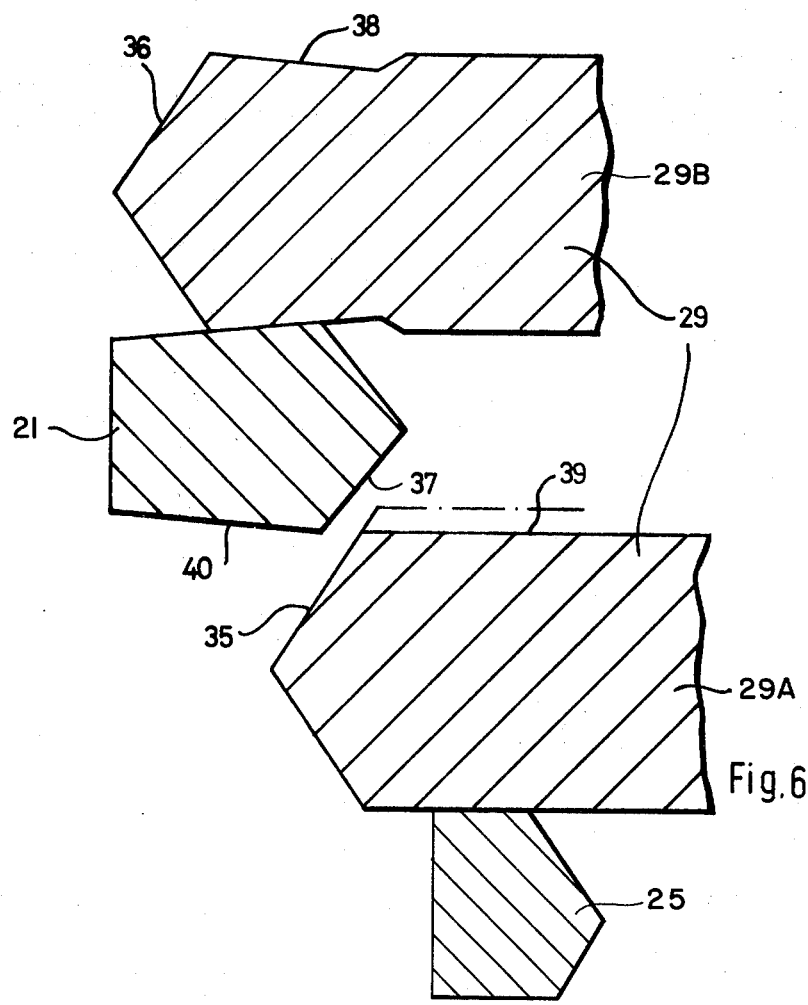

Further details and developments of the present invention will appear from the following description of an embodiment represented in the drawing and subsequently explained in connection with the claims. The accompanying drawings show:

FIG. 1 a very schematized block diagram of a fully synchronized four-speed intermediate transmission gear unit, FIG. 2 a partial longitudinal section through a gear-shift sleeve with adjoining parts, FIG. 3 a view of the gear-shift sleeve in the direction of arrow III in FIG. 2, FIG. 4 a view of the teeth of the gear-shift sleeve in the direction of arrow IV in FIG. 3, FIG. 5 a view of the teeth of the gear-shift sleeve in the direction of arrow V in FIG. 3, and FIG. 6 in a very enlarged representation, as compared to the other Figures, a part section along the pitch circle through a plurality of meshing teeth of the gear-shift sleeve and the clutch body, taken along line VI—VI in FIG. 2.

A driving plate 2 which is rigidly secured to a drive shaft 3 is rotated by an internal combustion engine or drive engine not represented in the drawing via a clutch 1. On this drive shaft 3 which extends into a gear unit 4 a gear wheel 5 is arranged so as to be torsionally rigid at the front end of said drive shaft, said gear wheel meshing with a gear wheel 6 which is arranged on a countershaft 7 so as to be torsionally rigid. The front end of the drive shaft 3 is provided with a bearing in which an output shaft 8 is supported on which gear wheels 9, 10 and 11 are pivoted. The gear wheels 9, 10 and 11 are in constant mesh with the gear wheels 12, 13 or 14 which are fitted to the countershaft 7 so as to be torsionally rigid. The diameter of the gear wheels 5, 9, 10 and 11 increases with the distance from the clutch 1, whereas the diameter of gear wheels 6, 12, 13, and 14 decreases in the same direction. If the gear wheel 5 is coupled to the output shaft 8 the direct or fourth gear is engaged. Coupling of the gear wheels 9 or 10 or 11 will accordingly engage the third, second or first gear, respectively. For gear shifting a gear-shift sleeve 15 is arranged on the output shaft 8 between the gear wheels 5 and 9 and a gear-shift sleeve 16 between the gear wheels 10 and 11 so that they are torsionally rigid but axially slidable. On the sides facing the gear-shift sleeves 15 or 16, clutch bodies 17 or 18 are rigidly secured to the gear wheels 5, 9, 10, and 11. In a generally known manner the clutch bodies are provided with an external toothing. The gear-shift sleeves are designed symmetrically to a center plane which is vertical to their rotation axis and they are provided with an internal tooth rim. By axial sliding of the gear of the gear-shift sleeves 15 or 16 one of the gear wheels 5, 9, 10 or 11 can be optionally connected to the output shaft 8 so as to be torsionally stiff.

The representation in FIGS. 2 through 5 is slightly enlarged as compared to the original size of conventional parts.

According to the representation in FIG. 2 the gear wheels 10 and 11 are pivoted on the output shaft 8 by means of needle bearings 19. On the sides facing one another, the clutch bodies 18 are secured to the gear wheels 10 and 11, for example by means of a serration 20, so as to be torsionally rigid. The clutch bodies 18 have the shape of an annular disk the outer circumference of which is provided with teeth 21 and the inner portion of which is joined on one side by a sleeve-like lug the external surface of which consists of a conical face 22. Each clutch body 18 is associated with a synchronizing ring 23 which is provided with a conical bore 24 fitting to the conical face 22 and the outer circumference of which is provided with lock teeth 25 corresponding to the teeth 21. Moreover, the synchronizing ring 23 is connected to a guide sleeve 27 by a positive mesh 26; in this case, the positive mesh 26 is designed so that a limited rotation of the synchronizing ring 23 relative to the guide sleeve 27 is possible. This rotation approximately corresponds to the angle of the tooth pitch of the lock teeth 25. The guide sleeve 27 is rigidly secured to the shaft 8 and, with the exception of the projections forming part of the positive mesh 26, it is provided with an external toothing 28 which is in mesh with an internal toothing 29 of the gear-shift sleeve 16. The internal toothing of the gear-shift sleeve 16 is provided with a circumferential annular groove 30 with oblique flanks against which a ball 31 bears in the neutral position of the gear-shift sleeve 16, said ball being guided in a radial bore 32 and being loaded by a helical coil compression spring which presses against the guide sleeve 27 at the bottom of the bore. Furthermore, the gear-shift sleeve 16 is provided with an external circumferential annular groove 34 in which a selector fork engages in a known manner which transmits the gear-shift force for the axial sliding of the gear-shift sleeve 16.

The design of the internal toothing of the gear-shift sleeve 16 varies along the circumference. For this purpose, the circumference of the gear-shift sleeve 16 is divided into six zones, namely into three zones A and three zones B. The teeth of the internal toothing 29 of the gear-shift sleeve 16 equal one another in the zones A. Likewise, the teeth in the zones B equal one another. However, the teeth in the zones A are different from the teeth in the zones B. The teeth in the zones A are represented in the upper area of FIG. 2. Their axial length is such that, in the represented neutral position of the gear-shift sleeve 16, their axial end faces are located at a small distance from the lock teeth 25 of the synchronizing ring 23. However, in the zones B, as represented in the lower portion of FIG. 2, the teeth of the internal toothing 29 of gear-shift sleeve 16 are axially extended and are facing the teeth 21 of the clutch body 18 at a distance of approximately 2 mm. The lock teeth 25 of the synchronizing ring 23 are only provided in the zones A but are missing in the zones which face the zones B of the gear-shift sleeve. In a generally known manner, all teeth are provided with tilts 35 or 36 or 37 on the front side, facilitating an engagement of the toothings which are not necessarily tooth to tooth space.

To engage a gear, the gear-shift sleeve 16 is axially shifted. In this case, first a guide block which possibly is also used for the achievement of the positive mesh 26, is axially shifted via the balls 31, said guide block being arranged relative to the guide sleeve 27 so that it is torsionally rigid but axially slidable. This guide block which is not represented in detail forces the synchronizing ring 23 together with its conical bore 24 against the conical face 22 whereby the synchronizing ring 23 rotates approximately half a tooth pitch of the lock teeth 25 relative to the gear-shift sleeve 16 and relative to the aforementioned guide block. Due to the frictional contact between the conical faces 22 and 24 the corresponding gear wheel 10 or 11, together with the other gear wheels and shafts which are in rotary connection therewith, is accelerated or decelerated until synchronous speed is attained. Thus, the accelerating or decelerating torque transmitted via the synchronizing ring 23 ceases to be effective and the gear-shift sleeve 16 can be pushed through the lock teeth 25 returning to their neutral position and engage the teeth 21 of the clutch body 18. The teeth in the zone B are already in mesh with the teeth 21 of the clutch body 18 once the internal toothing 29 has engaged the lock teeth 25. In the previously known embodiment corresponding to the representation shown in the upper area of FIG. 2, the teeth of the internal toothing 29 first engage the lock teeth 25 and then the teeth 21 of the clutch body 18. However, in the embodiment according to the invention, the teeth of zone A admittedly also first engage the lock teeth 25 but immediately afterwards the teeth of zone B engage the teeth 21, without the gear-shift sleeve 16 having to transverse the intermediate space between the lock teeth 25 and the teeth 21. The spacing between the teeth of the internal toothing 29 in zone B and the teeth 21 in the neutral position of the gear-shift sleeve 16 is approximately such that, in the case of axial shifting of the gear-shift sleeve 16, the teeth of zone B engage the teeth 21 only after the synchronizing operation is terminated and the lock teeth 25 have released the gear-shift sleeve 16 for being shifted further.

Since the tilts 35 of the teeth in zone A admittedly engage the tilts of the lock teeth 25 but not the tilts 37 of the teeth 21, matching of the tilts 35 to the tilts 37 is not necessary. However, the tilts 36 of the teeth of the internal toothing 29 in zone B are specially matched to the tilts 37 of the teeth 21 of the clutch body 18. Consequently, the vertical angles of the tilts 35 may differ from the vertical angles of the tilts 36, which has hitherto not been possible because all teeth of the internal toothing 29 hitherto were engaging both the lock teeth 25 and the teeth 21 of the clutch body 18.

The teeth of the toothing 29 in zone B are backed, i.e. they are provided with axially oblique flanks 38. In contrast to this, the axially shorter teeth in zone A are provided with flanks 39 which are parallel to the axis and to one another. It must be mentioned that, in the plan view, the two oblique flanks 38 of a tooth in zone B are wedge-shaped and not parallel to one another. The teeth 21 of the clutch body 18 have corresponding oblique flanks 40.

Due to the fact that the gear-shift sleeve and the synchronizing ring are designed according to the invention, a considerable reduction of the travel of gear-shift sleeve 16 is possible, without increasing the operating force. The reduction approximately corresponds to the axial extension of the lock teeth 25 of synchronizing ring 23.

Having thus fully described my invention, what I claim as new and wish to secure by Letters Patent is:

1. In a synchronized change speed gear unit for a vehicle having a power-train, the unit including at least one pair of gear wheels, a gear-shift sleeve provided with internal teeth, means for axially shifting the sleeve to bring the gear wheels into engaging and disengaging alignment with the power train, a shaft connected in torsionally rigid fashion to said gear-shift sleeve, a clutch body having external teeth and being rigidly secured to one of said pair of gear wheels, said one of said pair of gear wheels being co-axial with the gear shift sleeve and having a synchronizing ring which in its circumferential direction is in positive connection with the gear shift sleeve and in frictional contact with the clutch body and which has lock teeth so positioned and constructed to permit meshing of the internal teeth of the sleeve with the external teeth of the clutch body at synchronous speed only, the improvement characterized by at least one zone in which certain of the teeth of the sleeve are unextended on its circumference towards the clutch body and at least two zones in which certain of the teeth of the sleeve are extended on its circumference towards the clutch body, and wherein the lock teeth of the synchronizing ring are provided on the ring only in the zone in which certain of the teeth of the sleeve are unextended on its circumference.

2. The change-speed gear unit according to claim 1, characterized in that the axially extended as well as the axially unextended teeth of the gear-shift sleeve are arranged on the same pitch circle.

3. The change-speed gear unit according to claim 1, characterized in that the tilts of the extended teeth which are provided at the axial front ends of the teeth of the gear-shift sleeve enclose another vertical angle than the unextended teeth which cooperate with the lock teeth of the synchronizing ring.

4. The change-speed gear unit according to claim 3, characterized in that the vertical angle of the extended teeth is smaller than the vertical angle of the unextended teeth.

5. The change-speed gear unit according to claim 3, characterized in that the vertical angle of the extended teeth is approximately 80° through 100°, preferably 90°.

6. The change-speed gear unit according to claim 3, characterized in that the vertical angle of the unextended teeth is approximately 100° through 120°, preferably 110°.

7. The change-speed gear unit according to claim 1, characterized in that the extension of part of the teeth of the gear-shift sleeve is such that the unextended teeth are relieved from the torque transmission, with a gear being engaged.

8. The change-speed gear unit according to claim 7, wherein the teeth of the clutch body are axially tapering towards the gear wheel, characterized in that the extended teeth of the gear-shift sleeve which transmit the torque are backed and that the unextended teeth of the gear-shift sleeve have flanks which are parallel relative to the axis and to one another.

9. The change-speed gear unit according to claim 1, characterized in that the tooth thickness of the unextended teeth of the gear-shift sleeve is larger than the corresponding width of the tooth spaces of the clutch body.

10. The change-speed gear unit according to claim 1, characterized in that the outside diameter of the unextended teeth of the gear-shift sleeve is smaller than the root diameter of the teeth of the clutch body.

11. The change-speed gear unit according to claim 1 characterized in that there are three zones in which certain of the teeth of the sleeve are extended on its circumference towards the clutch body.

* * * * *